United States Patent

[11] 3,624,604

[72] Inventor David William Gibbard
Royston, England
[21] Appl. No. 85,384
[22] Filed Oct. 30, 1970
[45] Patented Nov. 30, 1971
[73] Assignee Image Analysing Computers Limited
Royston, England
[32] Priority Oct. 31, 1969
[33] Great Britain
[31] 53,403/69

[54] IMAGE ANALYSIS
30 Claims, 8 Drawing Figs.

[52] U.S. Cl. 340/146.3AC, 340/172.5
[51] Int. Cl. G06k 9/06
[50] Field of Search 340/146.3, 172.5

[56] References Cited
UNITED STATES PATENTS
3,177,469 4/1965 Chow 340/146.3 J
OTHER REFERENCES
Grimsdale, R.L. et al., " A System for the Automatic Recognition of Patterns," Proc. of IEEE, Vol. 106, PT. B, No. 26, March 1959, pp. 210–221 Copy in 340/146.3 AC

*Primary Examiner*—Thomas A. Robinson
*Assistant Examiner*—William W. Cochran
*Attorney*—Beveridge & De Grandi

ABSTRACT: The invention relates to image analysis systems which provide for the computation of primary and secondary parameters of detected features in a field of view, typically relating to their geometrical or densitometric properties. The primary parameters relating to each feature are accurately associated therewith by means of a coincidence circuit which generates an anticoincidence pulse immediately following the completion of scanning of each detected feature in the field of view. A first computer generates the primary associated parameters in response to the anticoincidence pulse and a second computer is provided to generate the secondary parameter or parameters from the output from the first computer. The first mentioned computer means may comprise a number of computers operated in parallel synchronism to provide their different outputs simultaneously. Alternatively a single computer may be used which is capable of being switched to perform each of the different functions to generate the primary parameters and the information required for their generation is supplied during a corresponding number of successive intervals of time to the input of the first computer and the output is stored in a corresponding number of signal stores which are all addressed at the anticoincidence point. The switching rate is typically at the frame scan frequency or is at a high multiple of the line scan rate.

Figure 1:
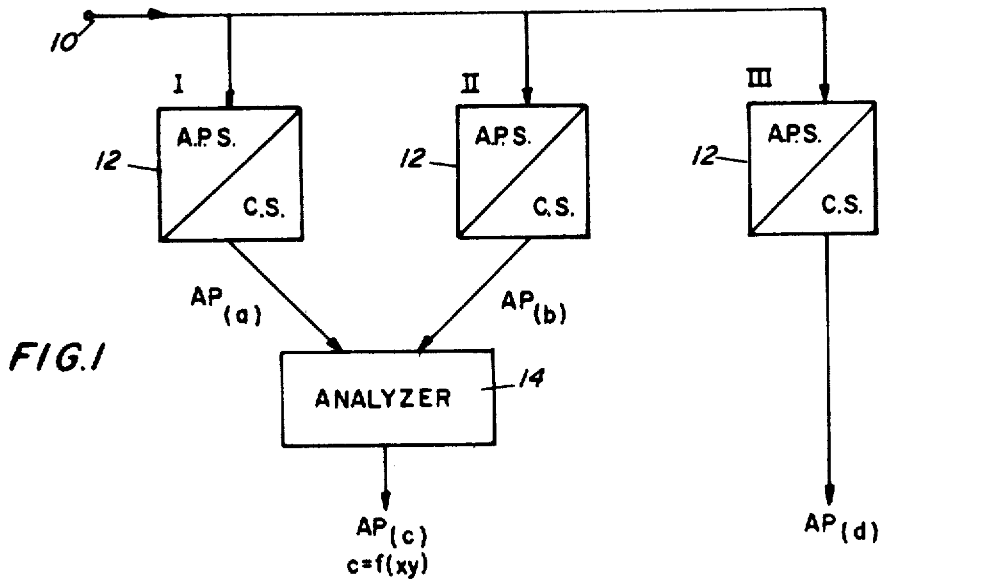

INVENTOR
DAVID W. GIBBARD
BY Beveridge and De Grandi
ATTORNEYS

INVENTOR
DAVID W. GIBBARD
BY Beveridge and DeGrandi
ATTORNEYS

INVENTOR
DAVID W. GIBBARD
BY Beveridge and De Grandi
ATTORNEYS

INVENTOR
DAVID W. GIBBARD

BY Bauerdge and DeGrandi
ATTORNEYS

INVENTOR
DAVID W. GIBBARD
BY Beveridge and De Grandi
ATTORNEYS

IMAGE ANALYSIS

This invention concerns image analysis systems and in particular relates to a system for obtaining a plurality of parameters associated with each of the features in an image under analysis.

There are many circumstances in which it is desirable to classify the features in a field of view according to their pattern characteristics. A well known but restricted example of this is the recognition of the letters of the alphabet or numerals.

If there is only one feature in the field of view, then it is a relatively simple matter to arrange an electronic threshold device to detect the feature and discriminate between the feature and its background. Various geometrical and densitometric characteristics such as area, perimeter, position in the field of view, shape and integrated density of the feature can then be derived from information contained in or computed from the chords formed by the intersections of the scan lines of the feature.

If however there are a number of features in the field of view, then in general each scan line will intersect more than one feature and scan intercepts of any particular feature will not follow one another in the video waveform. The scan intercepts in fact constitute chords from each feature and the chords from various features will therefore follow one another in a complex intermingled sequence. In order to attribute the various chords to the correct features and thus buildup a description of each individual feature separately, it is necessary to employ an associated parameter system of the type described in our copending British Pat. application No. 20613 / 68 . Such a system comprises two parts, (i) an associated parameter computer and (ii) a coincidence detector. An increment of information relating to the associated parameter may be forthcoming from or during each scan intersection with the feature and each such increment of information is made available within the associated parameter computer at a convenient instant during each such scan intersection of the feature. In this way the value of the associated parameter stored in the associated parameter computer is modified and updated during or at the end of each scan intersection so that it represents the contribution of all the increments of information so far received, which relate to the parameter for that feature. The coincidence detector determines when the last intersect of the feature by a scan line has occurred and controls the release of the stored information relating to the parameter, at a unique instant known as the anticoincidence point for that feature. This point is determined by the coincidence detector. Typically, the anticoincidence point for any given feature occurs just after the scanning of that feature has been completed. Since the parameter is associated with one feature in the field of view such a parameter is termed an "associated parameter".

An associated parameter obtained in this way may be described as a primary associated parameter since it can be obtained by computing the information from one detected video signal in one associated parameter computer. Thus area, length and height may be described as primary parameters.

Unfortunately many interesting patterns of the features cannot be classified by a single primary parameter. Furthermore other patterns cannot be classified by primary parameters at all and can only be classified by what may be described as secondary parameters. The term "secondary parameter" means a parameter which is itself derived from two or more primary parameters associated with a feature. The derivation of such a secondary parameter may be by direct computation of two or more primary associated parameters or derivatives thereof, or may be the modification or recognition of one or more primary associated parameters depending on criteria imposed on other of the primary associated parameters. It is therefore an object of the present invention to provide a system whereby two or more primary associated parameters are made available simultaneously.

According to the broadest aspect of the present invention an image analysis system capable of supplying at least one secondary associated parameter in addition to primary associated parameters for each of some or all the features in a field under analysis, comprises a source of scanned video signal corresponding to the field, detector means for supplying one or more detected video signals corresponding to the features in the field, computer means responsive to the detected video signal or signals and controlled by coincidence detector means whereby the information in the computer means is updated by the end of each scan intercept with a detected feature and operable to provide two or more different primary associated parameters for the detected video signal or signals for each detected feature, addressing means controlled by said coincidence detector means to recover each primary associated parameter at a unique point in relation to the associated feature and further computer means responsive to the output of the addressing means to generate the secondary associated parameter therefrom.

Preferably, both the detector means, the primary associated parameter computer means, the coincidence detector means, the addressing means and the further computer means are digitally controlled from a master timing generator. To this end a master timing generator is provided which supplies synchronizing pulses typically referred to as clock pulses.

It will be appreciated that all the parameter computers may be controlled by a single coincidence detector to reduce duplication of equipment.

Where all the primary associated parameters can be computed from the binary output of a threshold detector, a single threshold detector may be employed which is common to all the primary associated parameter computers. However where differently detected video signals are required for the different primary associated parameter computers, an appropriate number of separate detectors are provided. Thus, a plurality of detectors to provide discrimination between a plurality of grey levels in features under analysis, may supply the inputs to a corresponding number of associated parameter computers.

Where a separate computer is provided to calculate each primary associated parameter, the addressing means conveniently comprises gating means in the output of each primary associated parameter computer, controlled by the coincidence detector means, thereby to supply the primary associated parameters simultaneously to the further computer means. In such an arrangement, signal delay means may be provided in some or all of the output signal paths from the primary associated parameter computers, to equalize the rise times for the different associated parameter paths.

In an alternative arrangement, a single associated parameter computer is provided which is adapted to be switched by switch means to perform each of $n$ different functions and each increment of information from each scanned intersect with a detected feature is supplied to the input of the associated parameter computer means at each of $n$ successive intervals of time and the associated parameter computer means is switched from function to function at the end of each successive interval and the addressing means comprises a plurality of signal delaying devices arranged to provide $n$ signal paths each including gating means, the time delay introduced by each said signal delay device being such that a unique one of each of the $n$ successive associated parameters generated by the associated parameter computer means appears at the gating means of each signal path at the same instant in time and all the gating devices in the signal paths are opened at said instant in time by a control signal derived from the coincidence detector means. In such an arrangement, the $n$ separate primary associated parameters may be generated by the primary associated parameter computer means during each of $n$ successive complete frame scans and the switching means is arranged to switch the function of the computer means at the end of each frame scan. Alternatively the switching means may operate at a frequency corresponding to a whole-number multiple of the line scan frequency and the input to the associated parameter computer means may include a plurality of signal delay devices arranged to provide $n$ signal paths between the output of the detector means and the input of the associated parameter computer means such that a signal appearing in the output of the detector means will be applied to the input of the primary associated parameter computer means and during ($n - 1$) successive intervals of time thereafter, each interval corresponding to the time period of the switching frequency of the switching means.

Where a single computer is employed, preferably means are employed for generating a warning signal of duration equal to $n$ switching pulses as applied to the switching means to indicate when the computer is busy and cannot receive other increments of information.

Also in an arrangement employing one computer, the switching means conveniently resets the associated parameter computer means to the first of its $n$ functions at the end of $n$ successive switching functions.

In a system employing a plurality of different associated parameter computers, the detector means may comprise a plurality of different detectors for applying differing detection criteria to the scanned video signal corresponding to the field and the outputs from the various detectors may be applied to respective ones of the associated parameter computers.

In a system employing a single associated parameter computer means, a plurality of detector means for applying differing detection criteria to the scanned video signal corresponding to the field may be provided in which event the outputs from the detector means are applied to the input to the associated parameter computer means during different ones of each of an appropriate number of successive frame scans or, where high speed switching of the associated parameter computer means is employed, during $n$ successive intervals of time determined by the switching means.

The term "further computer means" can also include an arrangement in which one primary associated parameter computer can be arranged to control the delivery or nondelivery of another primary associated parameter in dependence on a comparison of the one primary associated parameter with a predetermined reference value. This technique is referred to as cross-gate quantizing and is particularly suited to sizing features in a field of view. Thus, the size of each feature is generated as one associated parameter and a count pulse is generated for each feature and is passed for subsequent addition provided the size value of the first associated parameter is less than, equal to or greater than a given size, depending on the criterion imposed. Thus all features of a particular size or greater than a particular size or less than a particular size can be counted. It will be appreciated that more than one criterion can be applied to an associated parameter by providing an appropriate number of gates in the path of the associated parameter and only opening each gate if the criterion associated therewith is fulfilled. Thus, in a feature counting exercise, the count pulse for each feature comprising one associated parameter, may be gated in dependence on (i) the size of the feature and (ii) the density of the feature. Provided both size and density criteria are fulfilled for the feature, then both gates are opened and the count pulse is transmitted.

Figure 2:
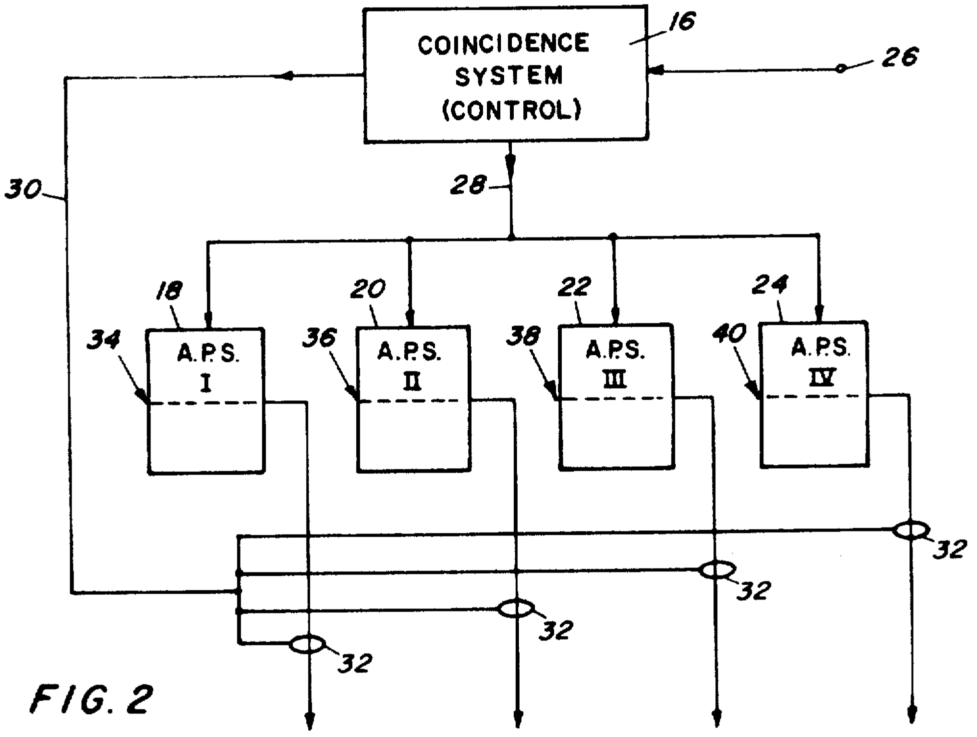
Figure 3:
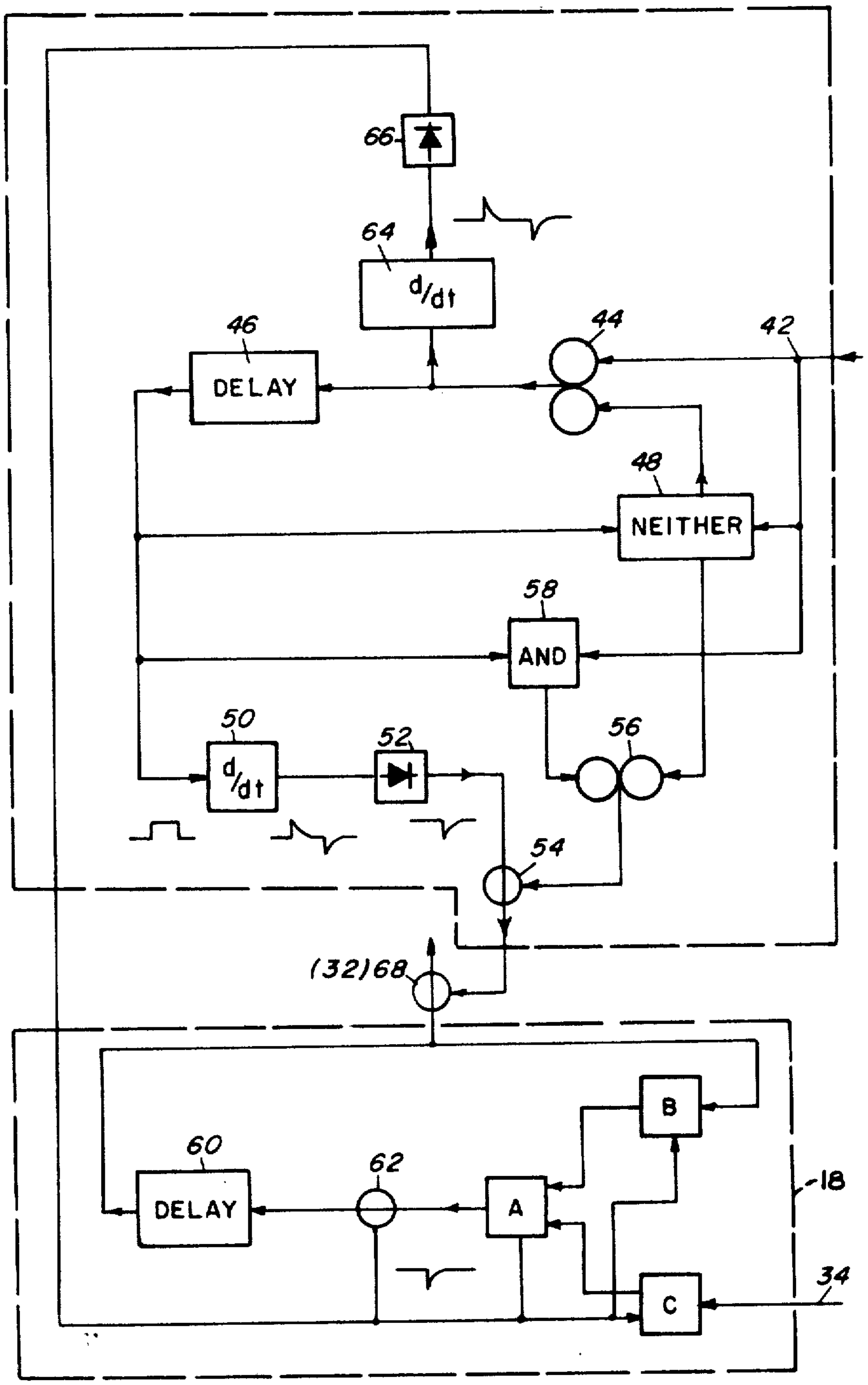
Figure 4:
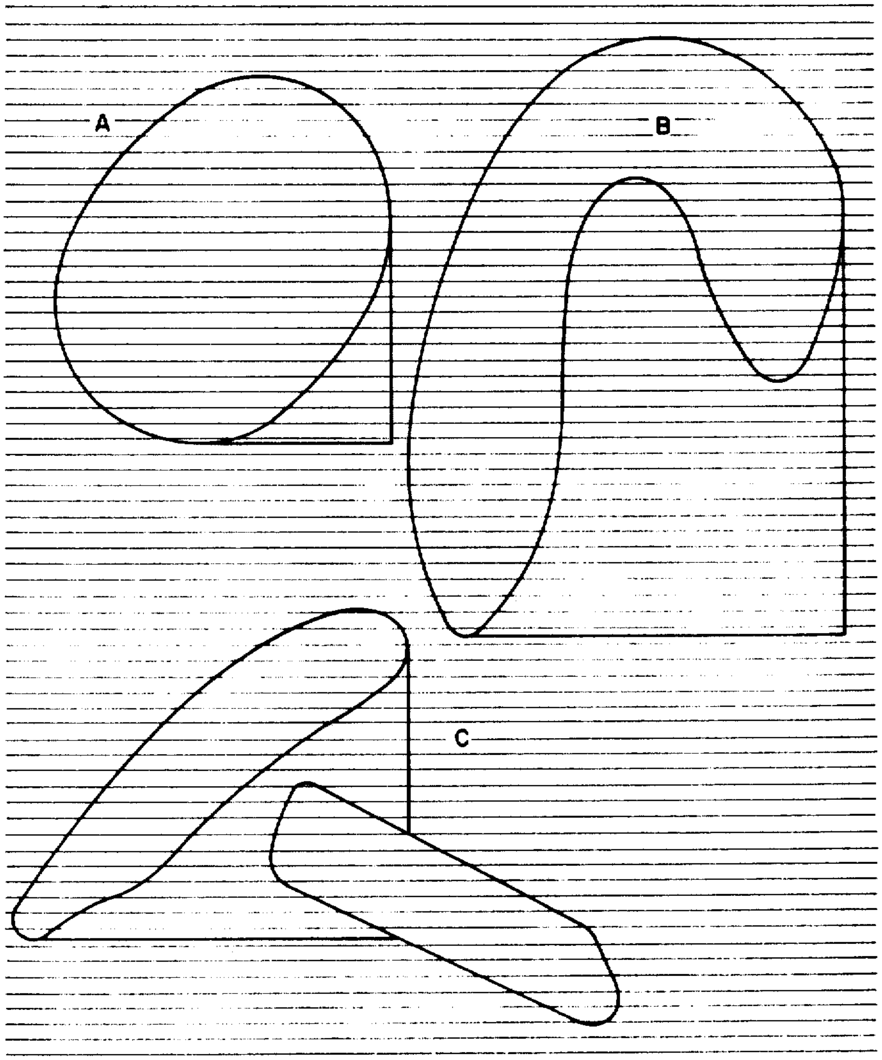
Figure 5:
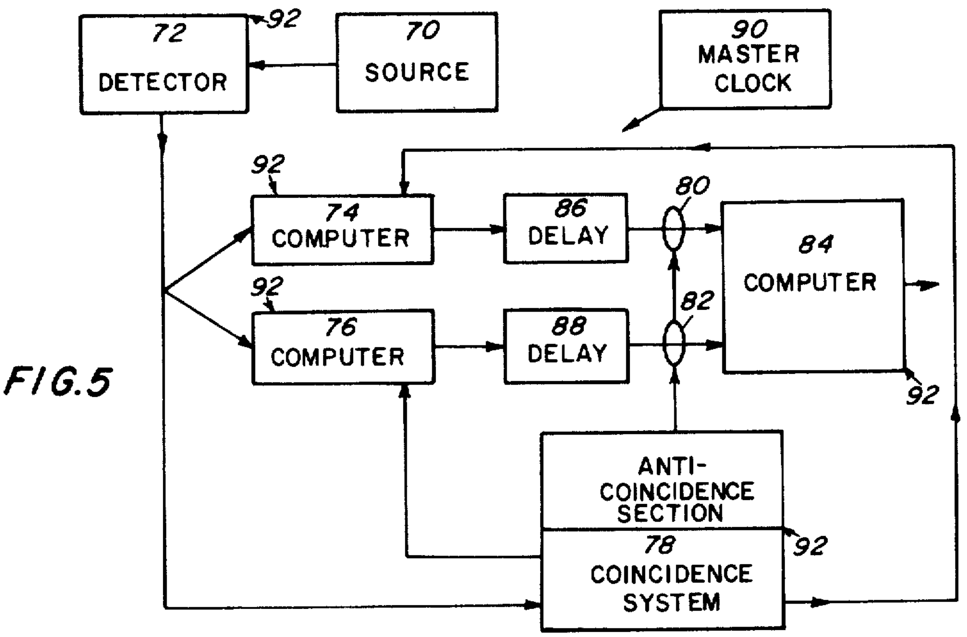
Figure 6:
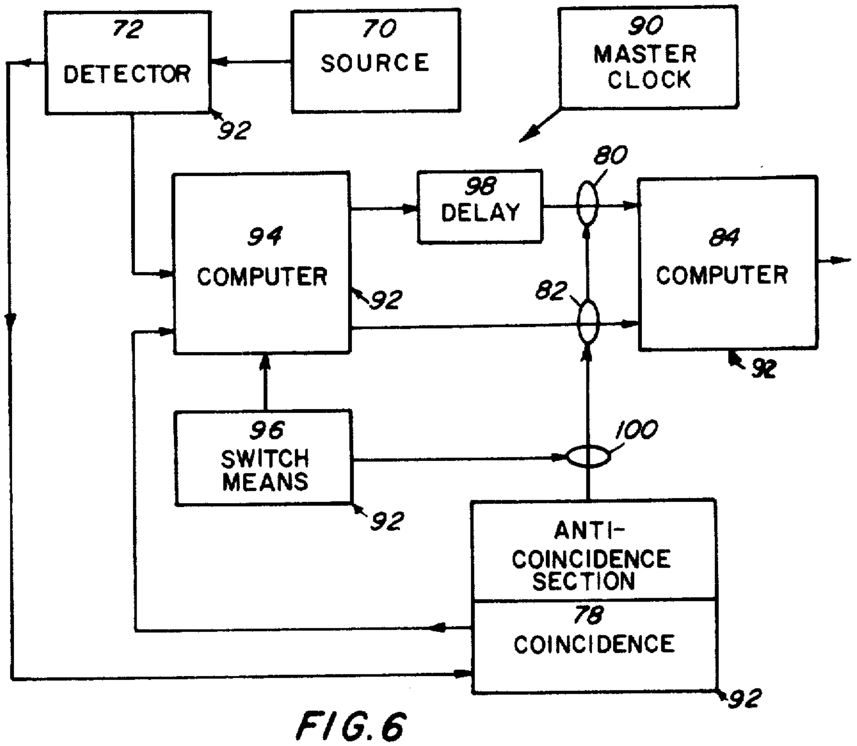
Figure 7:
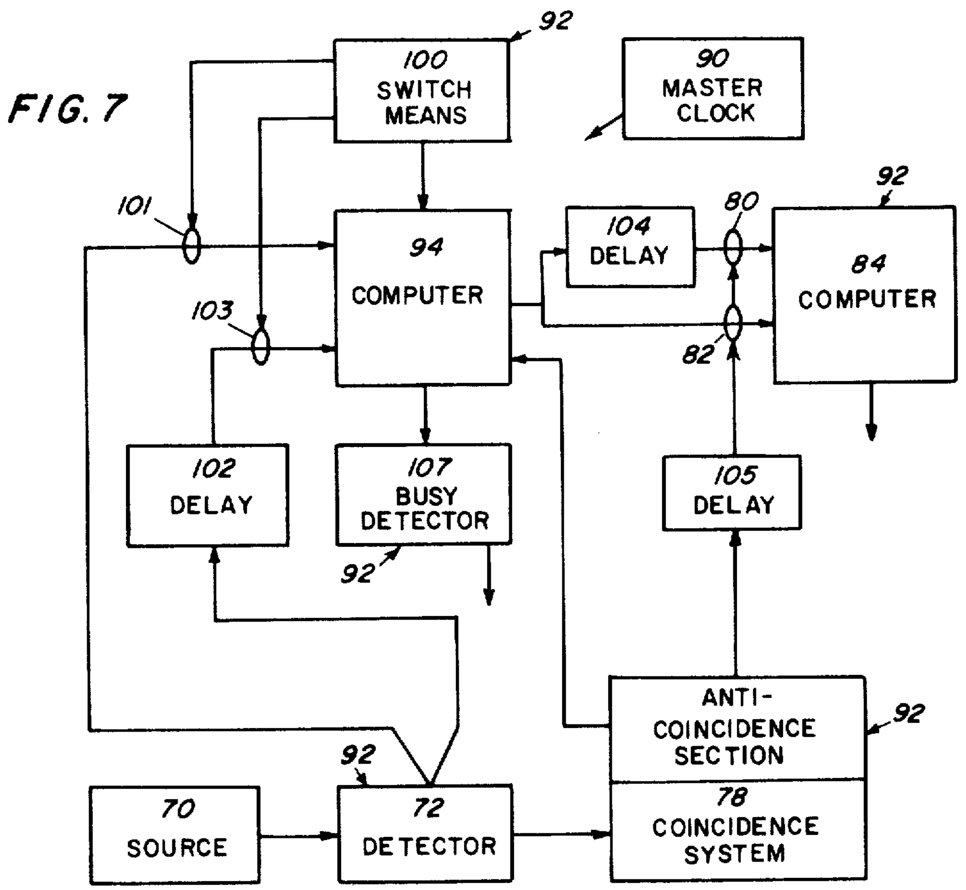
Figure 8:
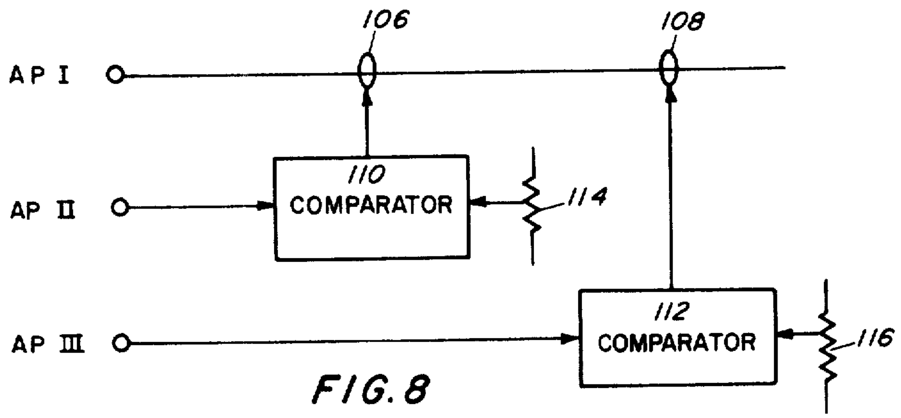

The invention will now be described by way of example with reference to the accompanying drawings, in which:

FIG. 1 illustrates by way of a block schematic diagram a multiple associated parameter system having three complete associated parameter systems connected in parallel synchronism, FIG. 2 illustrates by way of a block schematic diagram, a multiple associated parameter system having one coincidence section and four associated parameter sections and constructed as one embodiment of the invention, FIG. 3 illustrates by way of a more detailed block schematic diagram, a coincidence section and one associated parameter section of the system shown in FIG. 2, FIG. 4 illustrates the effect of adding modified video to features, FIG. 5 is a block circuit diagram of part of a clock controlled image analyzing system employing two associated parameter computers in parallel, FIG. 6 is a block circuit diagram of part of a clock controlled image analyzing system employing a single complex computer switched from frame to frame to compute two different associated parameters FIG. 7 is a block circuit diagram of a portion of a clock controlled image analyzing system employing a complex computer capable of being switched very rapidly many times during a complete line scan thereby to compute two different associated parameters for each detected feature from one frame scan and from which one or more secondary associated parameters can be computed and FIG. 8 is a block circuit diagram of an arrangement for handling three primary associated parameters and releasing one of these parameters in dependence on satisfactory results from criteria applied to the other two associated parameters.

FIG. 1 illustrates a multiple parameter system supplied with video signal from a single source 10, which may comprise a television camera. The system includes three separate associated parameter systems 12 (systems I, II and III), each of which is made up of an associated parameter section (APS) and a coincidence section (CS).

Each associated parameter system is arranged to generate a unique associated parameter for each feature in an image under analysis. One of the associated parameters, $AP_d$ from system III is of use alone.

However the two associated parameters ($AP_a$ and $AP_b$) from systems I and II require to be combined, for example mathematically, to produce the associated parameter $AP_c$. To this end the outputs from the systems I and II are applied to an analyzer 14, arranged to combine the associated parameters $AP_a$ and $AP_b$ in the appropriate manner.

FIG. 2 illustrates a multiple associated parameter system having a single coincidence system 16 (CS) which serves as a master control for four associated parameter systems (APS) 18, 20, 22, 24. The CS 16 is supplied with video signal from source 26 and supplies controlling signals during each scan line intersecting a feature under analyzis, along line 28, to each of the four APS' s. In addition it supplies an anticoincidence pulse at the end of each complete scan of a feature, along line 30 to each of four signal gates 32, to open the gates at the end of each complete scan.

Information is supplied to each of the four APS' s via input lines 34, 36, 38 and 40. The control signals from the CS 16 along line 28 cause the APS' s to update the stored information during each scan line intersection with each feature. The anticoincidence pulse at the end of the scan of a feature causes the stored information relating to that feature to be transferred via a gate 32, as an output.

It will be seen that any number of APS' s may be controlled in this way by a single CS.

The information supplied to the APS' s may be detected video. In this event the inputs 34, 36, 38 and 40 may be connected to the point 26. Alternatively for example, some of the inputs may be supplied with detected video from point 26 and others with a scanned video signal synchronized with the detected video, of an image with which it is desired to compare the image under examination.

FIG. 3 illustrates in more detail a coincidence section 16 –referred to hereinafter as CS and one associated parameter section 18 –hereinafter referred to as (APS) of the four which would be required to assemble the multiple associated parameter system of FIG. 2. In FIG. 3 the video signal is applied to the junction 42 (which corresponds to 26 in FIG. 2) and serves as a set signal for a bistable device 44 to produce a so-called "modified video" V'. The modified video is applied to a coincidence delay device 46 (such as a delay line or shift register) which introduces a time delay equivalent to a single line scan, T. The video signal is also supplied to one side of a Neither-gate 48 and the delay modified video V' from the delay device 46 is applied to the other side of the Neither-gate 48, the arrangement being such that when neither signal is present a signal passes from the Neither-gate 48 to reset the binary device 44. Modified video V' thus starts when a video signal is first received at junction 42 and stops when both video and unmodified video from a previous line stops. The effect is to add large shadow regions to the features, as is illustrated in FIG. 4.

The bottom right-hand corner of each feature is detected by the anticoincidence detector portion of CS 16 which comprises a differentiating circuit 50 and a rectifying circuit 52 which serve to produce a pulse corresponding to the end of each modified video signal in each line. The pulse from the rectifying circuit 52 is fed through a gate 54 which is controlled by a bistable device 56 which is set to close the gate if there has been coincidence, that is, a video signal from the current scan line and modified video from the previous scan line have coincided. The bistable device 56 is provided with two inputs, one from the Neither-gate 48 and the other from an AND-gate 58 whose two inputs have applied thereto delayed video from the coincidence delay 46 and current video from the junction 42. The output from the AND-gate 58 serves to supply one side of the binary device 56. Thus the binary is reset thereby opening the gate 54 immediately after the end of modified video V' , when there is no detected video in the current scan line corresponding to that feature. In this way a pulse will only pass through the gate 54 at the "bottom right-hand corner" of the modified feature shape. For convenience this pulse is referred to as an "anticoincidence pulse" , i.e., ACP.

The circuit can also be used for computing a parameter derived from the characteristics of the video signal (or some other synchronous signal) keeping the value in association with the particular feature concerned. This function is performed by the associated parameter section APS-(18) shown at the bottom of the circuit diagram of FIG. 3. The associated parameter circuit includes a first logic module or block C to which the current video signal from junction 42 is supplied. This logic unit C produces the particular parameter of interest in synchronism with the current video signal for example, its presence, its length, its position in the scan, or the value of some other related signal etc. A second logic module B receives and holds the signal from an associated parameter delay device 60 (such as a delay line or shift register). This signal corresponds to the value of the parameter computed up to and including the previous scan line. The third logic module A accepts both these values and computes a fresh value to include the information from the current scan line. This new value is held in the logic module A ready for application to the delay 60. The input for a differentiating circuit 64 is derived from the modified video signal V' and the differentiated signal is supplied to a rectifying circuit 66. The differentiating and rectifying circuits 64, 66 thereby produce one pulse at the end of each modified video signal V' . This pulse serves to open the gate 62 at a time, corresponding to the end of a modified video signal, so thaT the output from the logic module A is applied immediately to the associated parameter delay 60.

The output from the rectifying circuit 66 is also arranged to reset the logic modules A, B and C and the associated parameter stored in the delay device 60 is released at the end of a feature, by opening a gate 68.

Various arrangements of logic modules A, B and C can give usable output characteristics. For example, by arranging that logic module C registers the length of the chord in the current lie scan and logic block A adds the output from B and C the associated parameter becomes the area of the feature. Similarly the height, the width or the perimeter of a feature may be determined.

FIG. 5 illustrates in somewhat greater detail than the preceding figures, part of an image analysis system in which more than one associated parameter is obtained for each feature that is detected. To this end the system comprises a source of video signal 70 which may for example by a television camera or a flying spot scanner which provides a scanned electrical video signal corresponding to a field under analysis. The output from the source 70 is applied to a threshold detector 72 which provides a two-state detected video signal which changes state when the video signal from the source 70 exceeds the threshold level set by the detector 72. Although not shown, provision is made for adjusting the threshold level set by the detector 72.

The two-state detected video signal from the detector 72 is supplied to the inputs of two computers 74 and 76 each of which is arranged to perform a specific and different function on the signal and provide an associated parameter for each detected feature in the field of view. To this end a coincidence system 78 is provided, which is also supplied with detected video signal from a detector 72 and supplies appropriate control information to the two computers 74, 76 to allow the information contained and generated within them to be associated with the features in the field of view.

The coincidence system 78 also provides switching pulses to open two gates 80, 82 in the signal output paths from the two computers 74, 76 respectively to release the information from the two computers 74, 76 at the same instant in time (i.e., at the anticoincidence point for each feature) for subsequent application to further computer means 84 by which one or more secondary associated parameters may be computed.

In order to ensure that the rise time for each of the two signal paths from the detector 72 to the two gates 80, 82, is identical, a delay device such as a delay line or shift register 86 and 88 is provided in the output signal path from each computer 74, 76 respectively, between each computer and its associated gate 80 or 82.

Synchronizm of the whole system is attained by means of a master clock pulse generator 90 which supplies synchronizing pulses to each of the circuit elements having applied thereto an oblique arrow identified by reference numeral 92. The synchronizing pulses serve to define the times at which two-state signals change state so that any change in state must always last for a whole-number multiple of synchronizing pulse intervals and can only begin and end at a sampling interval determined by a pulse from the master clock pulse generator. In the event that the system is controlled by a master clock pulse generator, it may not be necessary to employ delay devices 86 and 88 since the slight variations in rise time of the various signal paths, will be largely compensated by the synchronous action of the clock pulses from the generator 90.

It will be appreciated that whereas only two associated parameter computers 74 and 76, have been illustrated in FIG. 5, any number of associated parameter computers may be provided in parallel and, likewise the detector 72 may be replaced by two or more detectors imposing different detection criteria on the video signal from the source 70 with the outputs of the various detectors being supplied to one or more of the parallel arranged associated parameter computers. Likewise the further computer means 84 for generating a secondary parameter has not been shown in detail and may comprise any convenient computer means for generating a signal either from or as a result of a combination of two or more primary associated parameters. Thus, for example, a secondary parameter may be derived by gating one of the primary associated parameters in dependence on comparison criteria applied to the other associated parameter signal or signals.

FIG. 6 illustrates an image analysis system in which a single computer 94 is employed in place of two computers 74, 76 of FIG. 5. The computer 94 is adapted to be switched to perform two different functions on information supplied thereto from a detector 72 and a control, referred to as switch means and identified by reference numeral 96 employed to switch the function of the computer 94 at the end of each frame scan. In this event, two complete scans of the field under analysis are required for the generation of the two associated parameters. A signal storage device such as a shift register for delay line 98 is provided in one of the output paths from the computer to store the computed value for one of the associated parameters while the other is computed. To this end the total delay imposed by the delay device 98 must equal one complete frame scan of the source 70. A further refinement is added by providing a gate 100 in the output path from the coincidence system 78 to the gates 80, 82. This gate is subjected to output from the switch means 96 which closes the gate 100 except during the release of the anticoincidence pulse from the coincidence system 78 during the second of each pair of frame scans. In this way the anticoincidence pulse from the coincidence system 78 is inhibited during the first of each pair of frame scan.

As with the system shown in FIG. 5, those circuit elements generating or controlling two-state signals are controlled by synchronizing pulses from a master clock pulse generator 90 and all such circuit elements are identified by an oblique arrow and the reference numeral 92. Also, it will be appreciated that the single detector 72 shown is in FIG. 6 may be replaced by two detectors imposing different threshold criteria on the video signal from the source 70 and the output signals from the two detectors gated by the switch means 96 and applied to the computer 94 during successive frame scans by the source 70. Furthermore, the computer 84 for computing the secondary parameter of parameters may comprise any convenient arrangement of computers or may comprise comparater circuit means or gating means whereby one or both of the associated parameters are gated in response to a comparison criterion imposed on one or the other of the two associated parameters from the computer 94. It will also be appreciated that the computer 94 may be more complex than that shown so as to be capable of being switched to perform any number of different functions on detected video signals supplied thereto. By providing appropriate switching signals from the switch means 96, such a computer may be switched at the end of each of an appropriate number of complete frame scans by the source 70 and a different associated parameter computed during each of the successive frame scans. In this event an appropriate number of parallel signal paths would be required from the output of the computer 94 with an appropriate delay device in each to store each associated parameter for an appropriate length of time so that all can be released at the same instant in time that is after the last associated parameters have been computed.

The system shown in FIG. 7 is similar to that shown in FIG. 6 in that the computer 94 is switched successively to perform different functions on video signals supplied thereto. However in the arrangement shown in FIG. 7, the switching means 100 is arranged to switch the computer function very rapidly from one function to the other and then to reset it to its original function as each item of information is received for computation within the computer 94 to update the associated parameter information contained therein. However, where the same information is required by the computer 94 during each of its two functions, a further delay 102 is required, which may be a delay line or a shift register, to store the detected video from the detector 72 for a short time interval corresponding to the time required by the computer 94 to perform one of its functions. A similar delay is required in the output from the computer 94 and this is identified 104. Thus the detected video is stored in the delay 102 whilst the first associated parameter is updated by the computer 94. At the end of this time the switch means 100 changes the function of the computer 94 and the information stored in the delay device 102 is then made available to the computer 94 for updating the second primary associated parameter. At the anticoincidence point for any given detected feature, the associated parameters computed for that feature by the computer 94 and stored as two discreet serial bits thereby, are released one after the other. A further delay 104 is thus provided which serves to delay the output signal from the computer 94 by an amount equal to that of the delay line 102. Thus when the second associated parameter becomes available for release from the computer 94 (in time) the first associated parameter already released is stored wholly within the delay device 104. The two associated parameters can then be released simultaneously by opening both gates 80 and 82 simultaneously by a delayed anticoincidence pulse from the coincidence system 78. This delayed switching pulse is attained from a further delay device 105 of equal delay to delay device 104. The two associated parameters are thus made available at the same point relative to their related feature and can thus still be related to it and are also available for subsequent computation within further computer means 84 to provide one or more secondary associated parameters.

As before the detector 72 is only shown in FIG. 7 as being a single detector and in practice two or more detectors may be employed for imposing different detection criteria on the video signal from the source 70. Likewise, for simplicity the computer 94 has been described as being capable only of being switched to perform two different functions. Again in practice this computer may be capable of being switched to perform many different functions in which event the input is supplied from an appropriate number of parallel paths from the detector 72 each containing a delay device different from the other paths so that the rise time of each path differs by the time required for the computer to perform one complete function. In this way the information available at the one instant of time is made available at successive intervals of time for subsequent computation by the computer 94. Likewise the output from the computer 94 must be temporarily stored by providing a corresponding number of parallel signal paths containing complementary delays to those in the input signal paths so that the total rise time between detector output and the gates such as 80, 82 shown in FIG. 7 is identical for each signal path. In this way the various primary associated parameters available in serialized form from the computer 94 can be made available in parallel form for subsequent computation by the further computer means 84.

In order to provide the computer 94 with information at correct instants in time, each signal path from the detector 74 includes a gate 101 and 103 and a switching signal to open the gate 101 is provided during the time interval during which the computer 94 performs its first function after which the gate 101 is closed and a switching signal is supplied to gate 103 for the duration of the interval during which the computer 94 performs its second function to open the gate 103. After this both gates remain closed.

A detector 107 is provided, responsive to an output signal from the computer 94 to indicate when this computer is busy. The detector 107 conveniently generates a warning signal which indicates a paralysis region since, it will be appreciated that, when the computer 94 is busy with information relating to one feature, it cannot at the same time deal with information relating to another feature. There will thus be a time during each line scan, immediately after the scan has ceased to intercept the feature, corresponding to the total time required by the computer 94 to perform both of its functions and reset itself, during which no further information can be dealt with by the computer. This time interval will represent a region of paralysis to the right of each feature in an image which is scanned from left to right. The warning signal from the detector 107 will indicate when the system is so and can be employed to divert subsequent information arriving during the busy period, for example to a store or to a second computer which is only brought into operation during busy intervals of the first computer. Alternatively the signal can be used to provide a marking pulse for any information which begins during the busy period to inhibit the information and disregard it so that at least incorrect information is not introduced but is simply disregarded.

Also as before, the system shown in FIG. 7 includes a master clock pulse generator 90 and those circuit elements to which synchronizing pulses are supplied are identified by an oblique arrow identified by the reference numeral 92.

While it is often necessary to actually compute a totally different parameter by mathematically combining two or more primary associated parameters, in some circumstances, the secondary parameter required may simply be a modified or gated version of one of the primary associated parameters. Thus for example, where it is desired to count all features in a field of view but impose on the count the criterion that all features counted must be larger than a given size and must possess an optical density greater than a certain level, an arrangement as shown in FIG. 8 might be provided as the further computer means 84. The arrangement comprises two gates 106 and 108 each of which is normally held in a closed position. The two gates are arranged in series in the signal path of a first associated parameter corresponding to a single count pulse generated for each detected feature in the field.

The preceding system is arranged to provide two further associated parameters simultaneously with the count pulses one corresponding to the area of each detected feature and the other corresponding to the optical density. The second and third associated parameters are applied separately to two comparaters 110 and 112 respectively having adjustable reference signal levels shown diagrammatically at 114 and 116 respectively. The comparater 110 is arranged to provide an output pulse if the area of the detected feature exceeds the size set by the threshold level 114 and this pulse is arranged to open the gate 106. Likewise the comparater 112 is arranged to provide a switching pulse for the gate 108 if the density of the detected feature exceeds the density level set by the reference threshold 116. In this way, if both criteria are satisfied, both gates 106 and 108 are opened and the count pulse for that feature is allowed to pass through for subsequent recordal. In the event however of either of the criteria not being fulfilled, no count pulse is passed by the circuit for that detected feature.

It will be appreciated that although the two gates 106 and 108 have been shown in the signal path for the first associated parameter, the circuit shown is not unique and for example gate 108 may be provided in the signal path from the comparater 110 to the gate 106 to inhibit the passage of the switching pulse from the comparater 110 to the gate 106 in the event that the optical density does not fulfill the density criterion imposed by comparater 112 and reference 116.

It will be further appreciated that the arrangement of FIG. 8 is solely one example of many different circuit arrangements which can be devised and which serve to pass or not pass one associated parameter or more than one associated parameter, in the event of certain criteria not being fulfilled.

It is to be understood that the term detection means as employed herein is intended to cover any device which derives a signal from the video signal relating to a part only of the video signal or to one or more variable components of the video signal. Thus, for example, it includes an analogue to digital converter which supplies digital information to the associated parameter computer means corresponding to density changes across boundaries in the image.

I claim:

1. An image analysis system capable of supplying at least one secondary associated parameter for each detected feature in a field under analysis, comprising in combination, a source of scanned video signal corresponding to the field, detector means for supplying one or more detected video signals corresponding to detected features in the field, computer means responsive to the detected video signal or signals and controlled by coincidence detector means whereby the information in the computer means is updated at or before the end of each scan intersect with a detected feature and operable to provide two or more different primary associated parameters from the detected video signal or signals for each detected feature, addressing means controlled by said coincidence detector means to recover each primary associated parameter at a unique point in relation to the associated feature and further computer means responsive to the output of the addressing means to generate the secondary associated parameter therefrom.

2. An image analysis system as set forth in claim 1 further comprising a master timing pulse generator and means for conveying timing pulses to the detector means, the primary parameter computer means, the coincidence detector means, the addressing means and the further computer means to thereby synchronize the operation of said various means.

3. An image analysis system as set forth in claim 2 wherein the primary associated parameter computer means is controlled by a single coincidence detector.

4. An image analysis system as set forth in claim 3 wherein a separate computer is provided to calculate each primary associated parameter and the addressing means comprises gating means in the output of each primary associated parameter computer, said gating means being controlled by the coincidence detector thereby to supply the primary associated parameters simultaneously to the further computer means.

5. An image analysis system as set forth in claim 4 further comprising signal delay means in some or all of the output signal paths from the primary associated parameter computers thereby to equalize the rise times for the different associated parameter signal paths.

6. An image analysis system as set forth in claim 5 wherein the detector means comprises a plurality of different detectors for applying differing detection criteria to the scanned video signal corresponding to the field, means being provided to supply the outputs from the various detectors to respective ones of the associated parameter computers.

7. An image analysis system as set forth in claim 1 wherein the primary associated parameter computer means is controlled by a single coincidence detector.

8. An image analysis system as set forth in claim 1 wherein a separate computer is provided to calculate each primary associated parameter and the addressing means comprises gating means in the output of each primary associated parameter computer, said gating means being controlled by the coincidence detector thereby to supply the primary associated parameters simultaneously to the further computer means.

9. An image analysis system as set forth in claim 2 wherein a separate computer is provided to calculate each primary associated parameter and the addressing means comprises gating means in the output of each primary associated parameter computer, said gating means being controlled by the coincidence detector thereby to supply the primary associated parameters simultaneously to the further computer means.

10. An image analysis system as set forth in claim 4 wherein the detector means comprises a plurality of different detectors for applying differing detection criteria to the scanned video signal corresponding to the field, means being provided to supply the outputs from the various detectors to respective ones of the associated parameter computers.

11. An image analysis system as set forth in claim 1 comprising a single associated parameter computer adapted to perform each of $n$ different functions, switch means operative on the computer to change its function, means for delivering each increment of information from each scan intersect with a detected feature to the input of the associated parameter computer means during each of $n$ successive intervals of time, said switch means changing the function of the associated parameter computer means at the end of each successive interval and addressing means comprising a plurality of signal delay devices arranged to provide $n$ signal paths, gating means in each signal path, the time delay introduced by each said signal delay device being such that a unique one of each of the $n$ successive associated parameters generated by the associated parameter computer means appears at the gating means of each signal path at the same instant in time and means controlling the opening and closing of the gating devices whereby all said gating devices may be opened simultaneously, said means controlling the gating devices being operable in response to a signal derived from the coincidence means.

12. An image analysis system as set forth in claim 2 comprising a single associated parameter computer adapted to perform each of $n$ different functions, switch means operative on the computer to change its function, means for delivering each increment of information from each scan intersect with a detected feature to the input of the associated parameter computer means during each of $n$ successive intervals of time, said switch means changing the function of the associated parameter computer means at the end of each successive interval and addressing means comprising a plurality of signal delay devices arranged to provide $n$ signal paths, gating means in each signal path, the time delay introduced by each said signal delay device being such that a unique one of each of the $n$ successive associated parameters generated by the associated parameter computer means appears at the gating means of each signal path at the same instant in time and means controlling the opening and closing of the gating devices whereby all said gating devices may be opened simultaneously, said means controlling the gating devices being operable in response to a signal derived from the coincidence detector means.

13. An image analysis system as claimed in claim 11 wherein each of the $n$ separate primary associated parameters is generated by the primary associated parameter computer means during each of $n$ successive complete frame scans and the switching means is arranged to switch the function of the computer means at the end of each frame scan.

14. An image analysis system as claimed in claim 12 wherein each of the $n$ separate primary associated parameters is generated by the primary associated parameter computer means during each of $n$ successive complete frame scans and the switching means is arranged to switch the function of the computer means at the end of each frame scan.

15. An image analysis system as set forth in claim 11 in which the switching means operates at a frequency corresponding to a whole-number multiple of the line scan frequency and the input to the associated parameter computer means includes a plurality of signal delay devices arranged to provide $n$ signal paths between the output of the detector means and the input of the associated parameter computer means such that a signal appearing in the output of the detector means will be applied to the input of the primary associated parameter computer means and during $(n - 1)$ successive intervals of time thereafter, each interval corresponding to the time period of the switching frequency of the switching means.

16. An image analysis system as set forth in claim 15 further comprising means for generating a warning signal of duration equal to $n$ switching pulses as applied to the switching means, at the instant when an increment of information from a line scan intersect of a detected feature is received in the input to the associated parameter computer means, said warning signal serving to indicate that the associated parameter computer means is busy and cannot receive any other increments of information for the duration thereof.

17. An image analysis system as set forth in claim 11 wherein said switching means resets the associated parameter computer means to the first of its $n$ functions at the end of $n$ successive switching operations.

18. An image analysis system as set forth in claim 12 wherein said switching means resets the associated parameter computer means to the first of its $n$ functions at the end of $n$ successive switching operations.

19. An image analysis system as set forth in claim 13 wherein said switching means resets the associated parameter computer means to the first of its $n$ functions at the end of $n$ successive switching operations.

20. An image analysis system as set forth in claim 14 wherein said switching means resets the associated parameter computer means to the first of its $n$ functions at the end of $n$ successive switching operations.

21. An image analysis system as set forth in claim 15 wherein said switching means resets the associated parameter computer means to the first of its $n$ functions at the end of $n$ successive switching operations.

22. An image analysis system as set forth in claim 16 wherein said switching means resets the associated parameter computer means to the first of its $n$ functions at the end of $n$ successive switching operations.

23. An image analysis system as set forth in claim 7 wherein the detector means comprises a plurality of different detectors thereby to apply differing detection criteria to the scanned video signal corresponding to the field and the outputs from the different detectors are applied to the input to the associated parameter computer means during different ones of each $n$ successive frame scans.

24. An image analysis system as set forth in claim 13 wherein the detector means comprises a plurality of different detectors thereby to applying differing detection criteria to the scanned video signal corresponding to the field and the outputs from the different detectors are applied to the input to the associated parameter computer means during different ones of each $n$ successive frame scans.

25. An image analysis system as set forth in claim 15 wherein the detector means comprises a plurality of detectors each applying a differing detection criteria to the scanned video signal corresponding to the field under analysis and the outputs from the different detectors are applied to different ones of the $n$ input signal paths to the associated parameter computer means whereby the differently detected video signals are applied to the input of the associated parameter computer means at the correct instant in time.

26. An image analysis system as set forth in claim 16 wherein the detector means comprises a plurality of detectors each applying a differing detection criteria to the scanned video signal corresponding to the field under analysis and the outputs from the different detectors are applied to different ones of the $n$ input signal paths to the associated parameter computer means whereby the differently detected video signals are applied to the the input of the associated parameter computer means at the correct instant in time.

27. An image analysis system as set forth in claim 17 wherein the detector means comprises a plurality of detectors each applying a differing detection criteria to the scanned video signal corresponding to the field under analysis and the outputs from the different detectors are applied to different ones of the $n$ input signal paths to the associated parameter computer means whereby the differently detected video signals are applied to the input of the associated parameter computer means at the correct instant in time.

28. An image analysis system as set forth in claim 1 wherein the further computer means comprises gating means in the signal path of one primary associated parameter and comparater means in the signal path of another primary associated parameter for comparing said other associated parameter with a predetermined reference and control means responsive to said comparison to open said gate means in the path of said one primary associated parameter provided that the said other associated parameter fulfills criteria imposed by said comparison.

29. An image analysis system as set forth in claim 2 wherein the further computer means comprises gating means in the signal path of one primary associated parameter and comparater means in the signal path of another primary associated parameter for comparing said other associated parameter with a predetermined reference and control means responsive to said comparison to open said gate means in the path of said one primary associated parameter provided that the said other associated parameter fulfills criteria imposed by said comparison.

30. An image analysis system as set forth in claim 4 wherein the further computer means comprises gating means in the signal path of one primary associated parameter and comparater means in the signal path of another primary associated parameter for comparing said other associated parameter with a predetermined reference and control means responsive to said comparison to open said gate means in the path of said one primary associated parameter provided that the said other associated parameter fulfills criteria imposed by said comparison.

* * * * *